(12) United States Patent
Weaver (10) Patent No.: US 6,404,426 B1
(45) Date of Patent: Jun. 11, 2002

(54) METHOD AND SYSTEM FOR A COMPUTER-RENDERED THREE-DIMENSIONAL MANNEQUIN

(75) Inventor: Christopher S. Weaver, Rockville, MD (US)

(73) Assignee: ZeniMax Media, Inc., Rockville, MD (US)

( * ) Notice: Subject to any disclaimer, the term of this patent is extended or adjusted under 35 U.S.C. 154(b) by 0 days.

(21) Appl. No.: 09/329,995

(22) Filed: Jun. 11, 1999

(51) Int. Cl.[7] .............................................. G06T 17/00
(52) U.S. Cl. ...................................... 345/419; 345/420
(58) Field of Search ............................... 345/418, 419, 345/420, 425

(56) References Cited

U.S. PATENT DOCUMENTS

| | | | |
|---|---|---|---|
| 4,926,344 A | 5/1990 | Collins et al. ............... | 364/513 |
| 5,363,476 A | 11/1994 | Kurashige et al. .......... | 395/125 |
| 5,483,630 A | 1/1996 | Unuma et al. ............... | 395/152 |
| 5,495,568 A | 2/1996 | Beavin ....................... | 395/164 |
| 5,530,652 A | 6/1996 | Croyle et al. ............... | 364/470 |
| 5,557,527 A | 9/1996 | Kotaki et al. .......... | 364/470.02 |
| 5,577,175 A | 11/1996 | Naka et al. .................. | 395/127 |
| 5,581,665 A | 12/1996 | Sugiura et al. ............... | 395/86 |
| 5,729,673 A | 3/1998 | Cooper et al. .............. | 395/127 |
| 5,745,666 A | 4/1998 | Gilley et al. ................. | 395/128 |
| 5,818,420 A | 10/1998 | Mitsumine et al. ......... | 345/156 |
| 5,850,222 A | 12/1998 | Cone .......................... | 345/418 |

OTHER PUBLICATIONS

U.S. New & World Report, *Business& Technology: Your Every Command*, Jul. 5, 1999.
Fortune, *Fortune's Information Technology Special Report; boo.com*, Jul. 5, 1999.
Public Technologies Multimedia, Inc., *Building My Model*, 1998.

*Primary Examiner*—Cliff N. Vo
(74) *Attorney, Agent, or Firm*—Piper Marbury Rudnick & Wolfe LLP; Wilburn L. Chesser (57) ABSTRACT

A human body is three-dimensionally reproduced to create a computer-rendered model. The model is dynamically manipulable to adjust or customize the dimensions of the model to specified measurements. Computer renderings of garments are stored in the computer. The model may be "clothed" with one or more garments, the representation of a garment being accurately adjusted to reflect its fit on a model of the model's particular dimensions. The computer will accurately represent the specific dimensions of the items of clothing in relation to the customized dimensions of the virtual mannequin. The virtual mannequin may be rotated and may be animated to thereby model the clothing and observe the interaction of the clothing with the environment. Once satisfied to the accuracy/appropriateness of the clothing, the computer can output appropriate dimensional, color and related coordinates.

29 Claims, 9 Drawing Sheets

METHOD AND SYSTEM FOR A COMPUTER-RENDERED THREE-DIMENSIONAL MANNEQUIN

The present invention relates generally to the field of virtual reality, and more particularly, to the accurate rendering of a three-dimensional model of a person wearing clothing and illustrating the fit and movement of the clothing.

BACKGROUND OF THE INVENTION

1. Field of the Invention

Purchasers and potential purchasers of clothing items are able to conveniently preview clothing items displayed in a catalog, in retail stores, and in on-line catalogs. One of the frustrations of purchasers, however, is that clothing items when purchased and actually worn do not meet the expectations developed by the catalog or in the dressing room.

Models in catalogs tend to be taller and thinner than most purchasers, thus developing high expectations for the garment appearance. A garment worn by a person not having model-type proportions might look quite different and might not be flattering. Moreover, a garment that is photographed or tried on under studio or dressing room lights may have quite a different coloring and reflectivity in other settings, such as day light, candle light, office lighting, and so forth. A person's coloring also affects whether a particular garment is appropriate.

Furthermore, the manner of photographing a garment, typically in a front pose, does not demonstrate back and side fit, and the flow of the garment in various activities. Fitting rooms attempt to solve the problem of front, back and side views by using multiple mirrors. Even so, observing the back view of one's self in a fitting room can be awkward. Fitting rooms obviously do not permit much testing of a garment in an active activity situation, or observance of a garment from a distance. It is desirable, nevertheless, for a potential purchaser to observe the reaction of the garment to activities such as walking, running, sitting, and so on.

Clothing purchased for a different person, such as a gift, cannot be tried on before purchase. There is no practical way to preliminarily ascertain whether a particular garment will be flattering when worn and when in action.

2. Description of the Related Art

Various methods and systems for illustrating the look of a garment on a particular person have been attempted. U.S. Pat. No. 5,850,222, Cone, has attempted a "virtual dressing room", in which a person's measurements are used to create a body data structure that represents the person's figure, by adjusting a standard body data structure. Unfortunately, a garment is represented by a two-dimensional image of the garment worn by a physical mannequin; the garment is inaccurately "stretched" to approximate the adjusted body structure, rather than representing the actual garment.

An on-line clothing catalog by Land's End, available at www.landsend.com, provides a two-dimensional, static representation of a personalized model wearing clothing specified by the user. The static, two-dimensional nature of the model neither permits various viewpoints of the model during activity nor observation of the garment's reaction to the environment.

U.S. Pat. No. 5,557,527, Kotaki et al., concerns the mesh mapping of a simulated knit garment (loop simulation image) on a virtual mannequin, for use in conjunction with designing knit garments. The loop simulation image is dragged and distorted to fit over a scanned-in model of a person. Thus, although Kotaki starts with an accurate representation of a garment, the drawbacks of Cone are magnified in Kotaki. Additionally, Kotaki does not address the accurate representation of a person.

Other methods have attempted to compare garment measurements to standardized or personalized sizes. For example, in U.S. Pat. No. 5,530,652, Croyle et al., a person and clothing are separately measured by a machine vision system. The data can be used to determine whether the garments are within tolerances, or to determine the best size of a particular piece of clothing for a person.

In a different field of application, computers have been used to study fabric characteristics, such as friction and wear. For example, in U.S. Pat. No. 5,495,568, Beavin, a three dimensional model moves, such as raising the arms, bending, walking or running, and the response of a fabric model to motion, stretching and friction is evaluated. Computers have also been used to create and alter garment patterns to fit standard or individualized body measurements, as in U.S. Pat. No. 4,926,344, Collins et al.

It is generally known in the field of computer graphics to manipulate three-dimensional objects, including shape and texture (U.S. Pat. No. 5,818,420, Mitsumine et al.); to render three-dimensional objects in two-dimensional space (U.S. Pat. No. 5,745,666, Gilley et al) and vice-versa (U.S. Pat. No. 5,363,476, Kurashige et al.); to manipulate two-dimensional objects in three-dimensional space (U.S. Pat. No. 5,729,673, Cooper et al.); and to move or animate three-dimensional objects (e.g., U.S. Pat. No. 5,581,665, Sugiura et al.; U.S. Pat. No. 5,577,175, Naka et al.; and U.S. Pat. No. 5,483,630, Unuma et al.).

Thus, there remains a need for a straightforward way for someone to view on a computer screen how a particular garment will look and flow on a particular person and/or in a particular setting. Further, there remains a need for accuracy in rendering such modeled garments.

BRIEF SUMMARY OF THE INVENTION

It is an object of the present invention to provide a three-dimensional computerized mannequin, having adjustable characteristics such as size, coloring and proportions, for use in modeling garments.

It is a further object of the present invention to provide for a computerized rendering of a model wearing a garment in a particular environment, in order to observe the reaction and flow of the garment to the environment.

It is another object of the present invention to provide for a computerized rending of a model wearing a garment, wherein the model engages in an activity, in order to observe the reaction and flow of the garment during the activity.

It is yet another object of the present invention to provide an adjustable three-dimensional computer-rendered model in connection with an on-line catalog of garments.

Another object of the invention is to observe a garment on a personalized mannequin from a variety of camera positions, distances, and angles.

According to the invention, there is provided a system and method for displaying garments on a computer-rendered three-dimensional mannequin. There is provided a computer-rendered model of a person, the model being three-dimensional and rotatable. A size selection control is provided, for selecting one of a plurality of sizes, the sizes to be applied to the model. A proportion selection control is provided, for selecting one of a plurality of proportions, a selected one of the proportions to be applied to the model. A garment selection control is provided for selecting one of a plurality of garments, a selected one of the garments to be displayed on the model.

Optionally, the method and system further include a motion selection control for selecting a motion to be applied to the model.

Further, the method and system may include an action selection control to apply an action to the model.

Moreover, the method and system may include an appearance feature selection control for selecting one of a plurality of appearance features, a selected one of the appearance features to be applied to the model.

Also included might be a appearance feature selection control corresponding to hair length, hair color and/or skin tone.

In the provided system, he action selection control might automatically select the action corresponding to the selected garment from a plurality of actions, each of the actions corresponding to ones of the garments.

A further option is a rotation selection control for rotating the model.

Further provided may be stored data corresponding to each of a plurality of models, the plurality of proportions, and/or the plurality of garments. In the system and method, the stored data corresponding to the garments or models may be stored on a magnetic storage media.

Optionally, the system may include a centralized computer on which the model is rendered, and a remote computer on which the model is displayed.

These and other objects, features and advantages of the present invention are readily apparent from the following drawings and detailed description.

DETAILED DESCRIPTION OF THE PREFERRED EMBODIMENT

Figure 1:
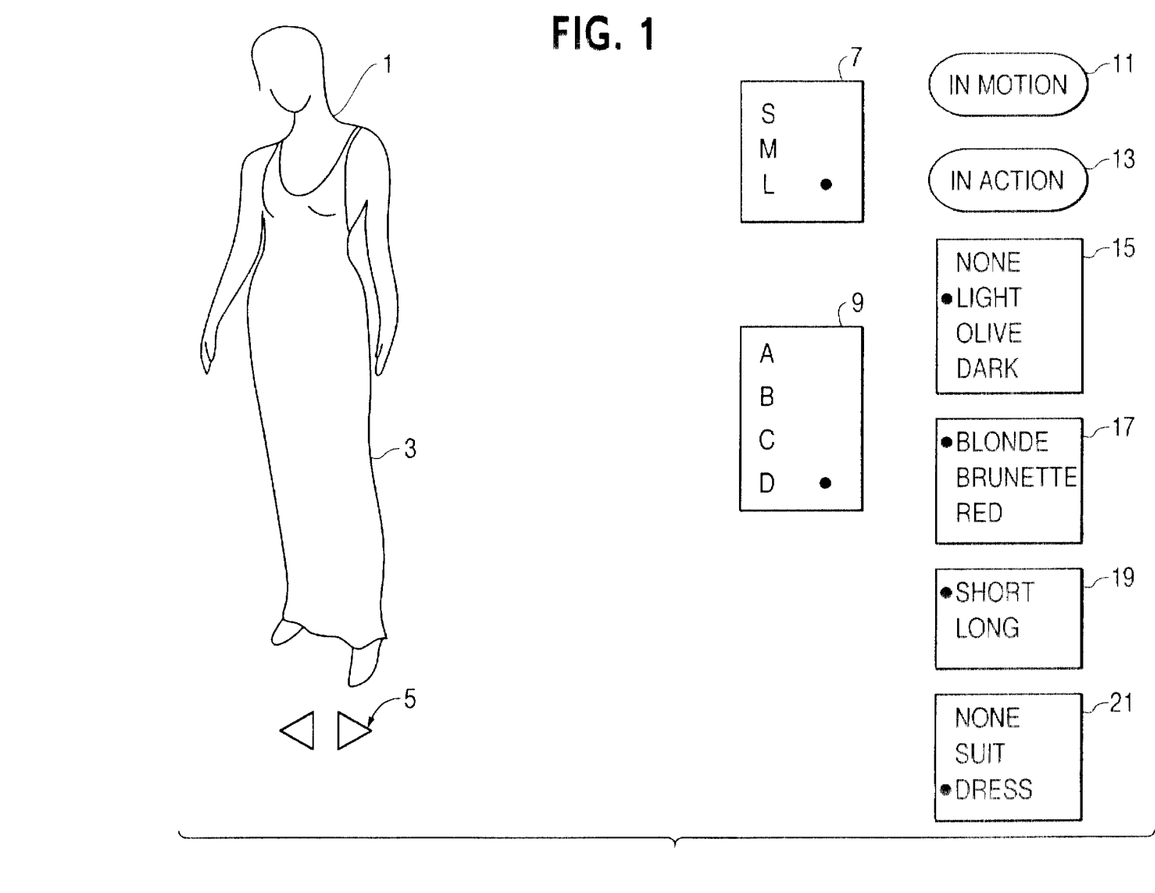
FIG. 1 is an illustration of a screen showing a personalized computer-rendered model of a person.

Reference is made to FIG. 1, illustrating a personalized, computer-rendered three-dimensional model of a person 1 wearing a garment 3. The model is provided with a rotational control 5. The user interface provides for a size selection control 7, a proportion selection control 9 and a clothing selection control 21. Further the user interface provides for a motion selection control 11, an action/environment selection control 13, and controls for selection of skin tone, hair color and hair length 15, 17, 19.

In the preferred embodiment, the computer model 1 of a person is rendered by any appropriate computer software for creating and displaying three-dimensional models. Preferably such software initially creates the model based on measurements and accurately depicts the sizing and proportion of the subject person. Alternatively, the model 1 may be based on standard sizes. It is advantageous for the computer model to be stored as a mesh database, further described below. One appropriate software package is sold by Auto Desk under the trademark 3D Studio Max.

Similarly, the garment 3 is rendered by appropriate computer software for creating three-dimensional models, preferably based on accurate measurements of the garment. Moreover, such software preferably takes into consideration garment qualities such as fabric drape, flow and reflectivity. Advantageously, garment information may be stored in mesh format. Where the garments are sold in various sizes, a measurement of a garment of each size should be taken, and separate information on each garment size should be stored. An appropriate package for creating and displaying such mesh databases is sold under the aforementioned trademark 3D Studio Max.

The rotational control 5 is provided, so that the user may rotate the computer model 1 to observe different aspects of the garment 3 as worn by the model 1. Here, the rotational control is provided in a vertical axis, to simulate a person turning left or right. Preferably, the rotational control provides full rotation of the model about the vertical axis in accordance with traditional animation principals. The rotational control is illustrated as a double arrow; it will be appreciated that there are many other methods for allowing a user to control rotation.

The size selection control 7 is provided so that the user may specify the overall size of the model 1 and garment 3. In the illustrated embodiment, the size options are small, medium and large. A finer granularity may be applied, if desired, for example to select a full range of standard women's dress sizes.

Since most individuals are not perfect fits for standardized sizes, the proportion selection control 9 is provided so that the user may fine-tune proportions. Advantageously, it is the most significant proportions, in terms of garment fit and appearance, that may be modified by the user. In the illustrated embodiment, the proportion selection control 9 allows selection of cup size A, B, C or D. The cup size proportion selection is particularly suitable in connection with high-end designer clothing and lingerie applications. It may be desirable in other applications to include additional or alternative proportion selections, such as hips, derriere, waist, etc. Notably, the suggested and preferred proportion selection and its effect on the garment 3 may be observed in the rotated appearance of the model 1 in a three-dimensional aspect, rather than a rotated 2-dimensional aspect.

The static appearance of the garment does not tell the complete story of the garment's ornamental appearance. Contributing to the appearance is the flow of the garment in reaction to motion. For example, some garments provide for limited stride; other garments provide for dramatic contrast between back and front necklines; still other garments provide for fluttering hemlines, etc. Therefore, the motion selection control 11 is provided to place the model 1 in motion. In the simplest version, the motion selection control 11 places the model 1 in an abbreviated runway demonstration, that is, the model takes several paces forward, turns, and returns. More elaborate motion control could be provided if desired. For example, other patterns of motion could be provided. Alternatively, motion could be provided specific to a garment, in order to highlight certain features of a garment that might otherwise remain unobserved.

To further illustrate features of the garments, there is provided an action/environment selection control 13. This control places the model 1 into action in a specific environment. In the preferred embodiment, there is provided for each garment 3 a specific pattern of action for the model and environment that is displayed when the user selects the action/environment selection control 13. For example, when clothing control 21 specifies "suit", the computer determines that the model 1 is displayed with the suit 3, and the corresponding action/environment "discotech" is displayed. This particular action/environment provides numerous bright lights, such as would occur in a discotech; the model 1 strides in a pattern about the virtual discotech, while modeling the garment, in three dimensions.] The action/environment illustrates the response of the garment to particular activity, such as stretching, fluttering, flow, highlights, sheerness, etc. Moreover, the action/environment permits the garment 3 to be illustrated in a setting designed to evoke a mood appropriate to the particular garment 3.

Preferably, additional controls are provided to permit adjustments to tailor the model's appearance to closely resemble a particular person. Such appearance controls advantageously include the skin tone selection control 15; the hair color selection control 17; and the hair length control 19. The skin tone selection control 15 allows the user to select one of a variety of skin tones and to apply the skin tone to the model 1. In the embodiment, the skin tones include none (a neutral gray), light, olive and dark. Of course, additional or fewer skin tones could be provided. The hair color control 17 similarly allows the user to select one of several hair colors and to apply the hair color to the model. In the preferred embodiment, the hair colors include blond, brunette and red; alternative or additional colors could be provided. The preferred embodiment also provides for selection of hair length via the hair length control 19. Here, two hair lengths are provided—short or long. Additional lengths or hair styles could be provided changing a texture. It will be appreciated that other controls could be provided to tailor the model's appearance, such as eye color and hair style; or that the controls could provide many more choices of hair color, for example.

The clothing selection control 21 provides the ability for the user to select one of several garments 3 which the model 1 will "wear". The preferred embodiment provides for a selection of no clothing, a suit or a dress as a selected garment 3. When the user selects a garment listed in the clothing selection control 21, the garment 3 is displayed on the model 1 as follows. The vertice information is stored in a mesh database. The set of garments from which a user may select should correspond to the garments available in a garment database, discussed in greater detail below. Where there are provided numerous garments in the garment database, the user interface may become more elaborate to permit selection of a particular garment, in accordance with known techniques. Further, it is possible for the user to select a combination of garments for the model 1 to "wear", for example, a skirt and blouse combination.

Figure 2:
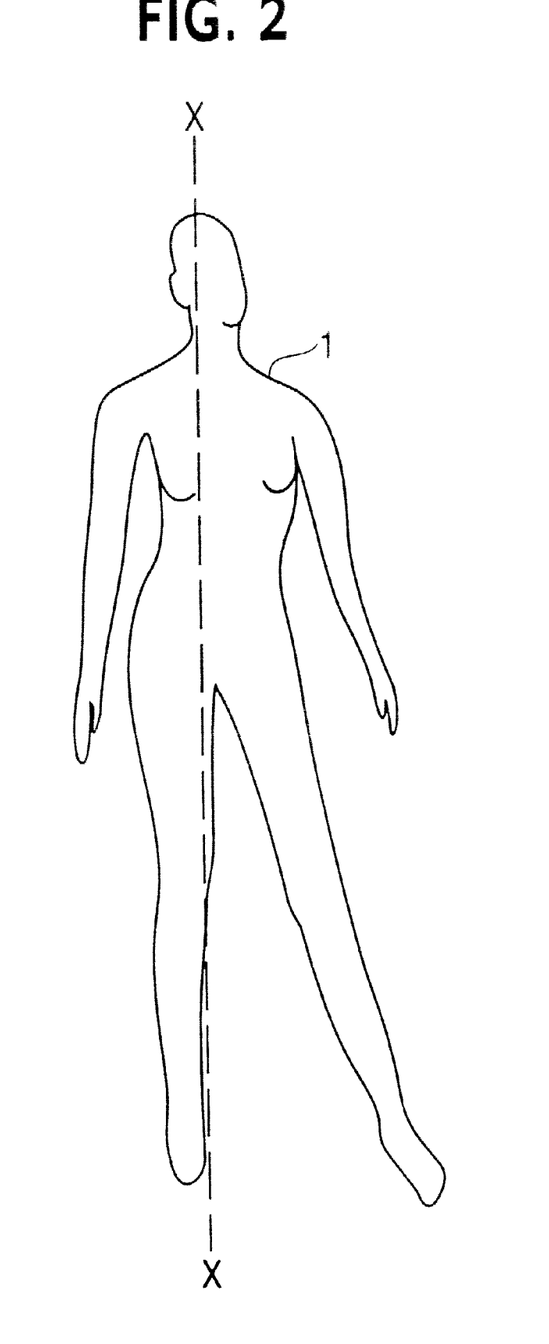
FIG. 2 is an illustration of a portion of a screen showing a computer-rendered model of a person prior to personalization.

FIG. 2 is an illustration of a portion of a screen showing a computer-rendered model 1 of a person prior to personalization. In the preferred embodiment, the model 1 may be provided with facial features, e.g., neutral or highly stylized. Further, the model 1 is illustrated in a neutral stance, preferably blocked at an angle to the viewer with arms and legs comfortably spaced to permit viewing of the garment 3 (not illustrated). When rotated by the rotational control 5, the model 1 in the preferred neutral stance will rotate about the vertical axis x. Alternative axes are, of course, possible. The model 1 may be provided with neutral or realistic anatomic features as preferred, in accordance with standard practice in this field. It is important that the model be three-dimensional and rotatable, so that the fit and appearance of the clothing may be observed from all angles.

Figure 3:
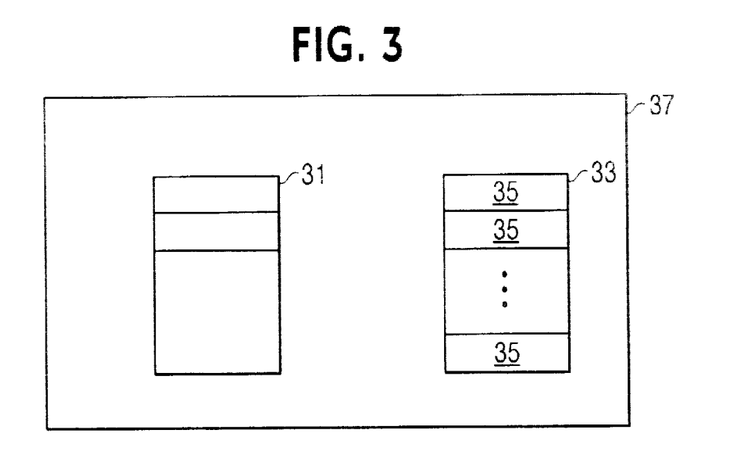
FIG. 3. is a block diagram showing the model database and virtual garment database.

FIG. 3 is a block diagram showing the model database 31 and virtual garment database 33 resident on a host computer 37. The model database 31 and garment database 33 should be capable of supporting an accurate three-dimensional rendering, preferably one that may be readily rotated and support altered environments. The data for the model database 31 is preferably selected as the designer desires, preferably to resemble a reasonably neutral figure which proportions would be acceptable as a base figure from where the proportions can be adjusted. by In the preferred embodiment, the model 1 is stored in a model database 31 as mesh data. In order to provide adjustable size and proportions, the model database 31 stores mesh data corresponding to each adjustable size. For example, in the illustrated embodiment, the model database 31 stores the entire mesh data for a small model 1, a medium model 1, and a large model 1. The various proportions selected by the proportion control are stored as mesh data for the affected body part only; the mesh data for the proportion is blended to the mesh data for the model when selected by the user. For example, in the illustrated embodiment, the model database 31 also stores the proportion mesh data for cup sizes A, B, C and D.

Similarly, the garment database 33 is preferably provided as mesh data. For each garment in each size, the garment database 33 stores garment data 35. However, it is possible for the garment database 33 to store basic mesh data for a garment, and for the garment to be adjusted according to the user-selected size and proportion(s). The data for each garment is created by the artist in order to accurately reflect the appearance, color, material (including reflection), material flow, texture, for example.

Figure 4:
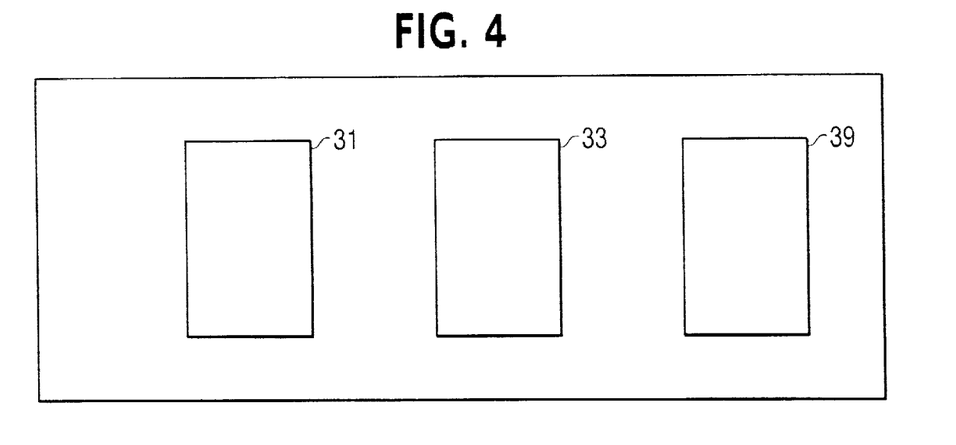
FIG. 4 is a block diagram showing the model database, virtual garment database, and environment database.

FIG. 4 illustrates the model database 31 and virtual garment database 33 in connection with an optional environment/action database 39. The environment/action database 39 contains data sufficient to render scenery, lighting, special effects, and to place the model 1 in motion on the screen. In the preferred embodiment, the environment/action database 39 contains one or more of the following elements:

Scenery

Lighting

Special effects

Model motion (scenery, light, textures, sound, music, streaming video. A script determines the model movement and other action in the scenery such as waves on a beach birds, etc.)

Figure 5:
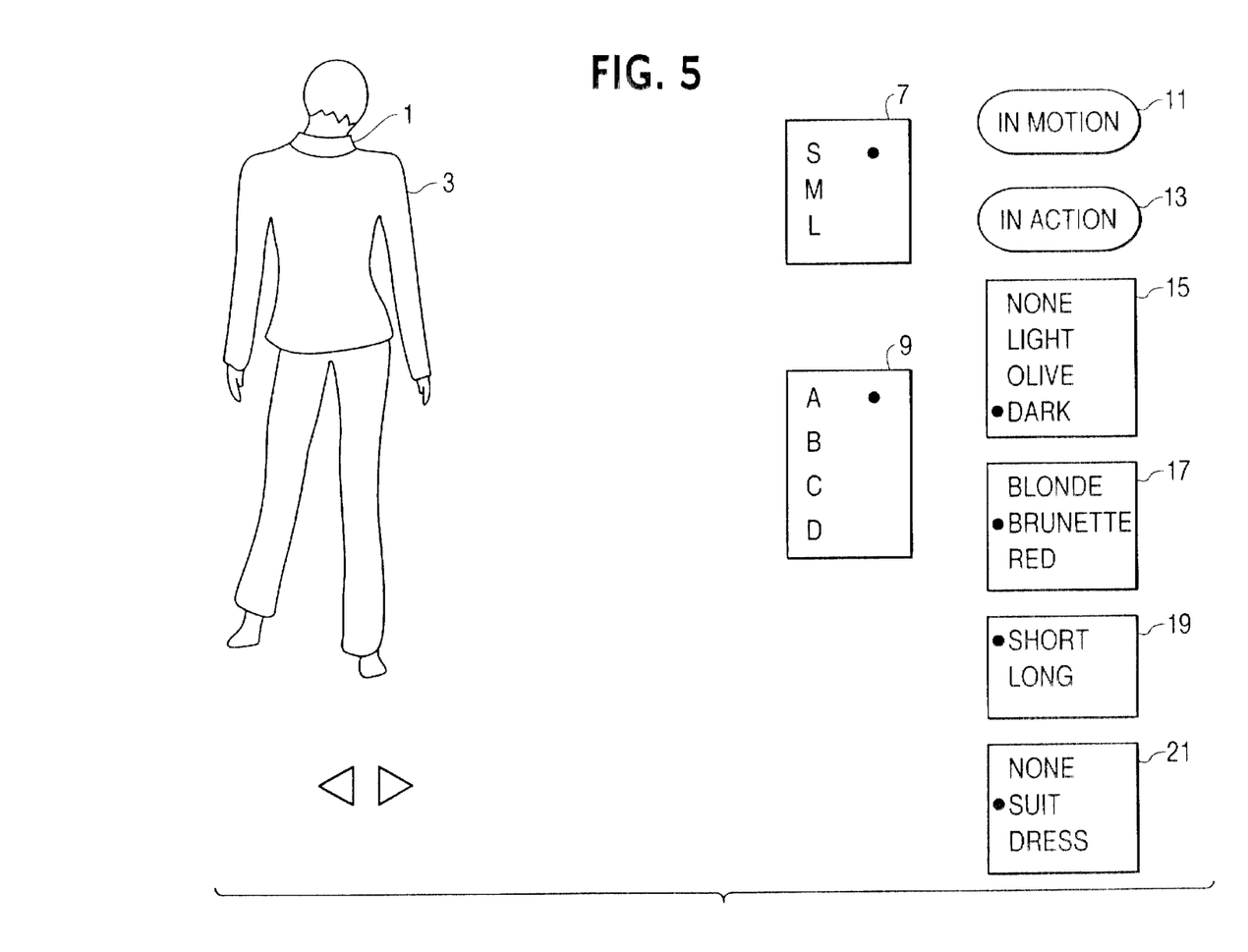
FIG. 5 is an illustration of a portion of a screen showing a personalized computer-rendered model of a person, showing rotation of the model.

FIG. 5 illustrates the model 1 with selections different from that illustrated in FIG. 1, illustrated as rotated 180 degrees. Here, the model 1 has a size selection control 7 at "small", proportion selection control 9 at "A", skin tone selection control 15 at "dark", hair color selection control 17 at "brunette", and hair length selection control 19 at "short." The clothing selection control 21 has selected "suit" as the garment 3.

Figure 6:
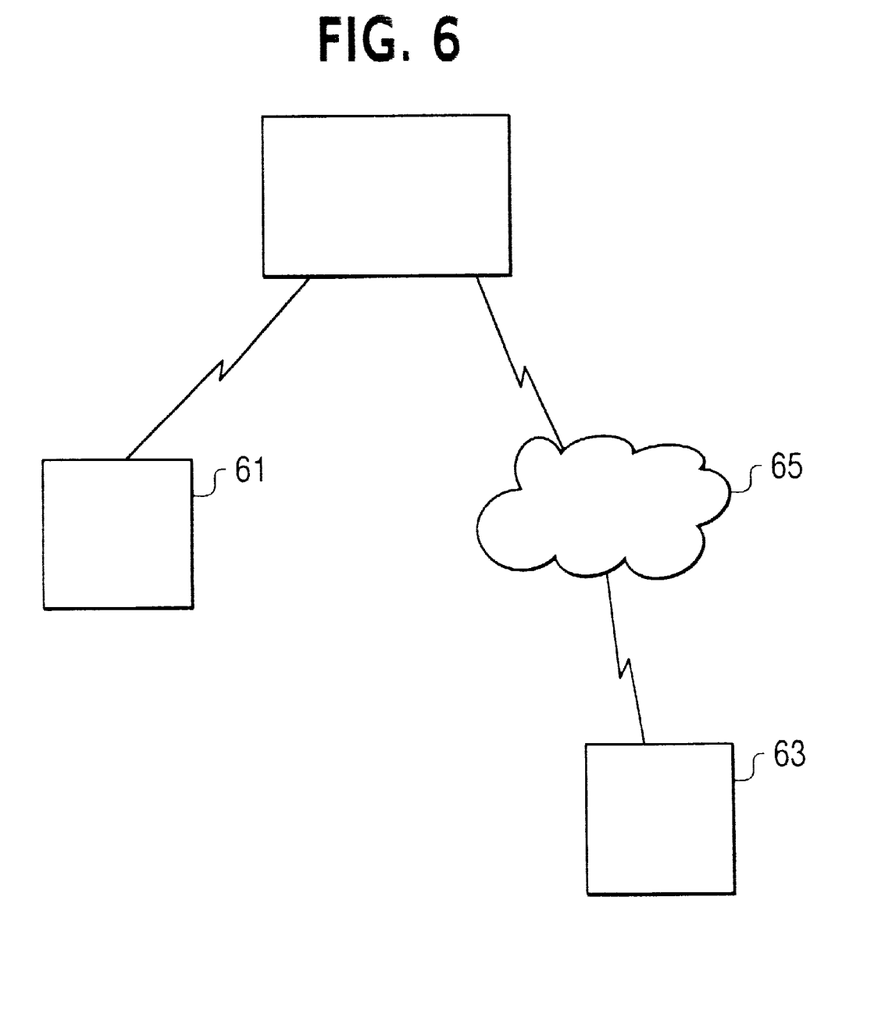
FIG. 6 is a block diagram illustrating the computer-rendered three-dimensional mannequin utilized in an on-line catalog application accessible over the internet.

FIG. 6 is a block diagram illustrating the computer-rendered three-dimensional mannequin utilized over the internet. The computer-rendered three-dimensional mannequin can be accessed by a local user 61 or other user with direct communications connection to the host 37. The mannequin can also be accessed by a remote user 63 via internet 65, an intranet, a cable modem, or other network access.

Advantageously, the mannequin is incorporated into an interactive on-line clothing sales catalog. In that instance, the garment database 33 is created as described above from clothing offered in the catalog.

Figure 7:
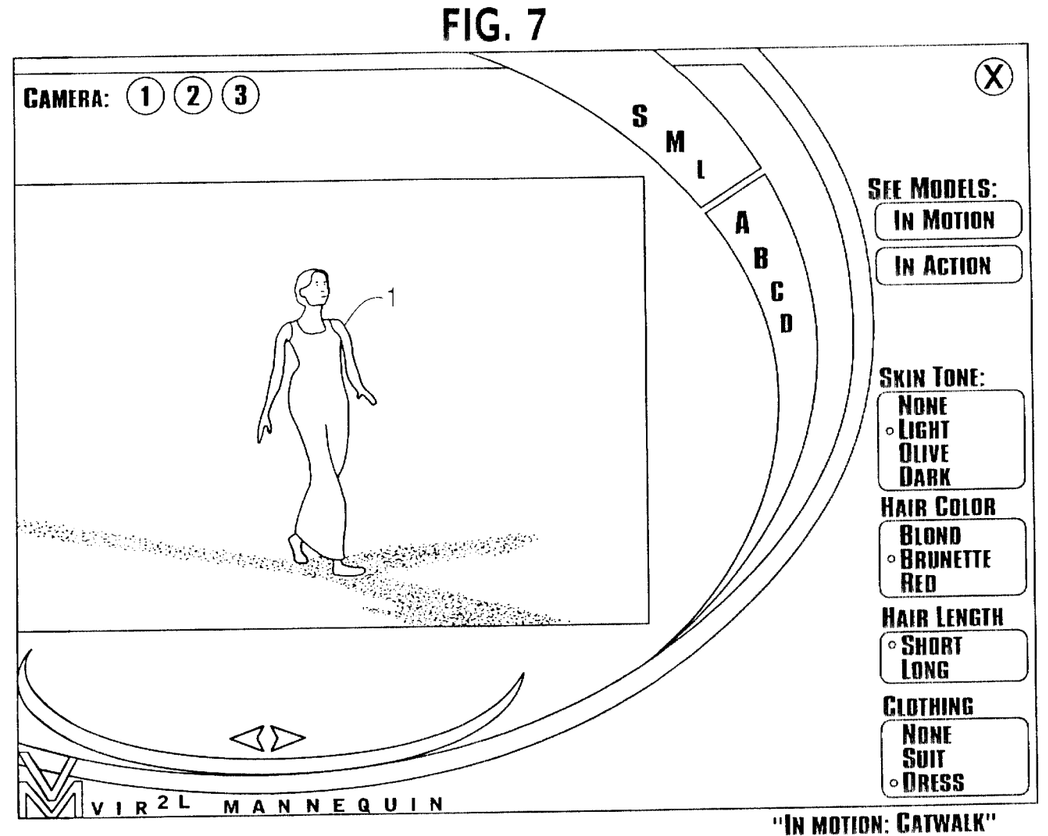
FIG. 7 is an illustration of the personalized computer-rendered model of a person, with action.

FIG. 7 is an illustration of the model 1, with action. In this illustration, the model 1 walks on a catwalk, in accordance with motion listed in a script.

Figure 8:
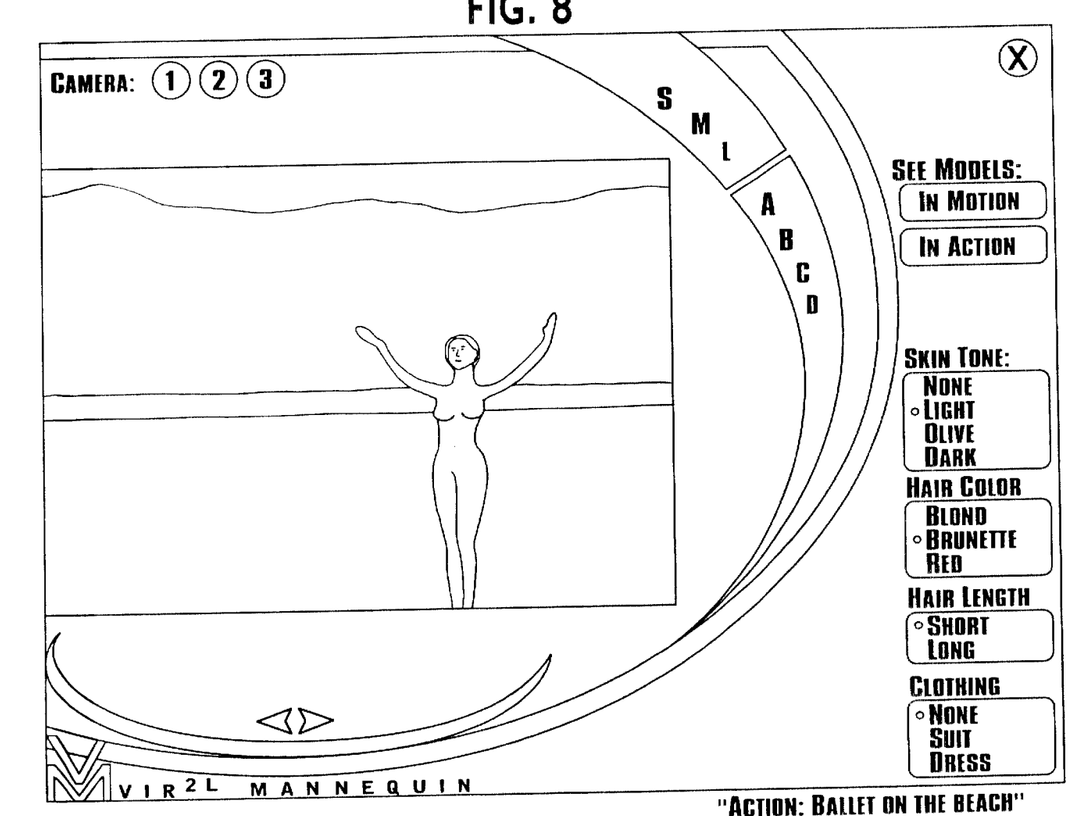
FIG. 8 is an illustration of the personalized computer-rendered model of a person, with a specified action/environment.

FIG. 8 is an illustration of the model 1, within a specified action/environment. Here, the environment is a beach. Note that the environment includes motion, such as waves lapping on a shore, and a breeze. A garment 3 illustrated in such an environment would react to the breeze, and to the motion of the model. The model would move in the environment in accordance with a script.

Figure 9A:
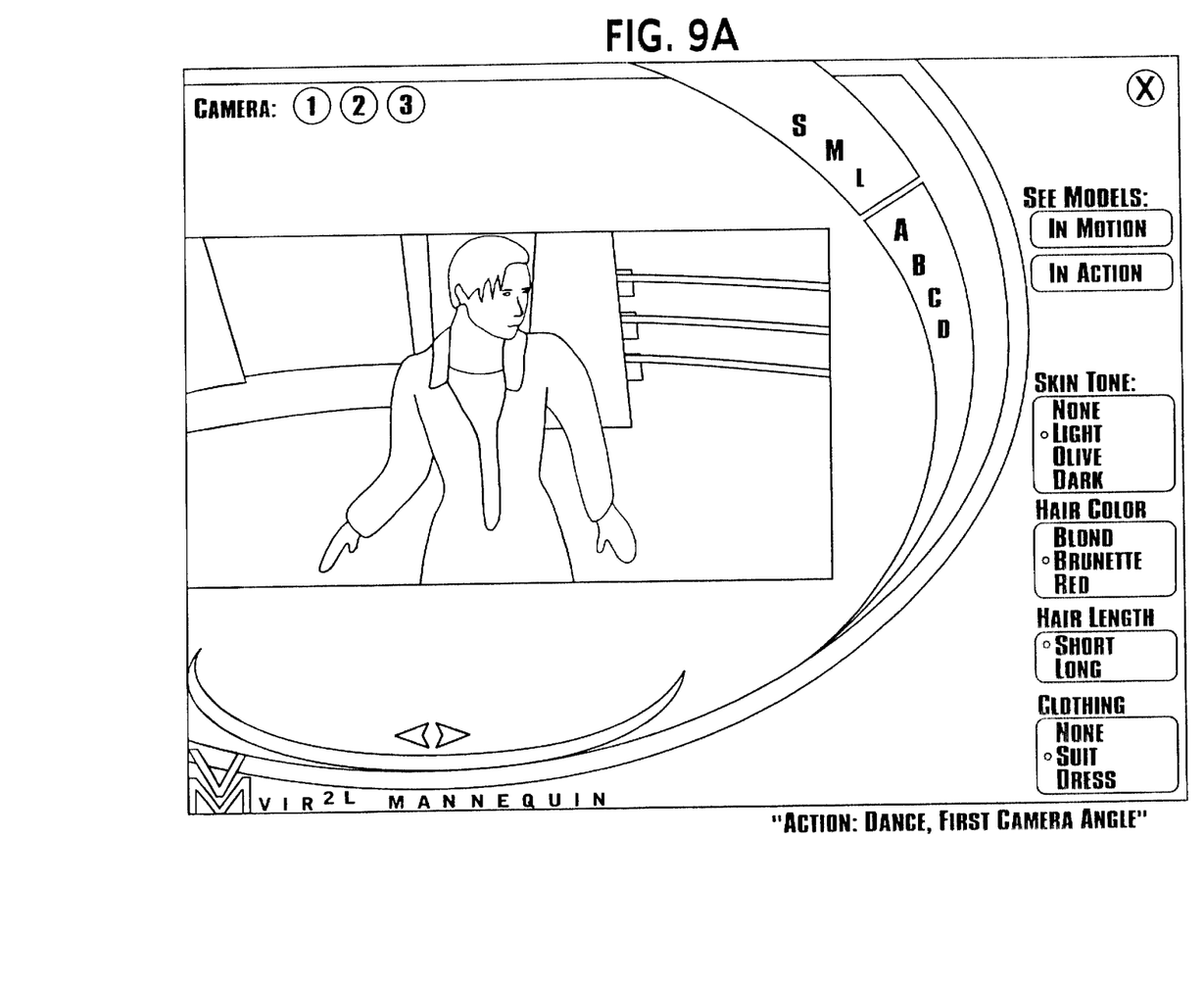
FIGS. 9A–B are an illustration of the personalized computer-rendered model of a person in a specified action/environment, with varying camera angles.
Figure 9B:
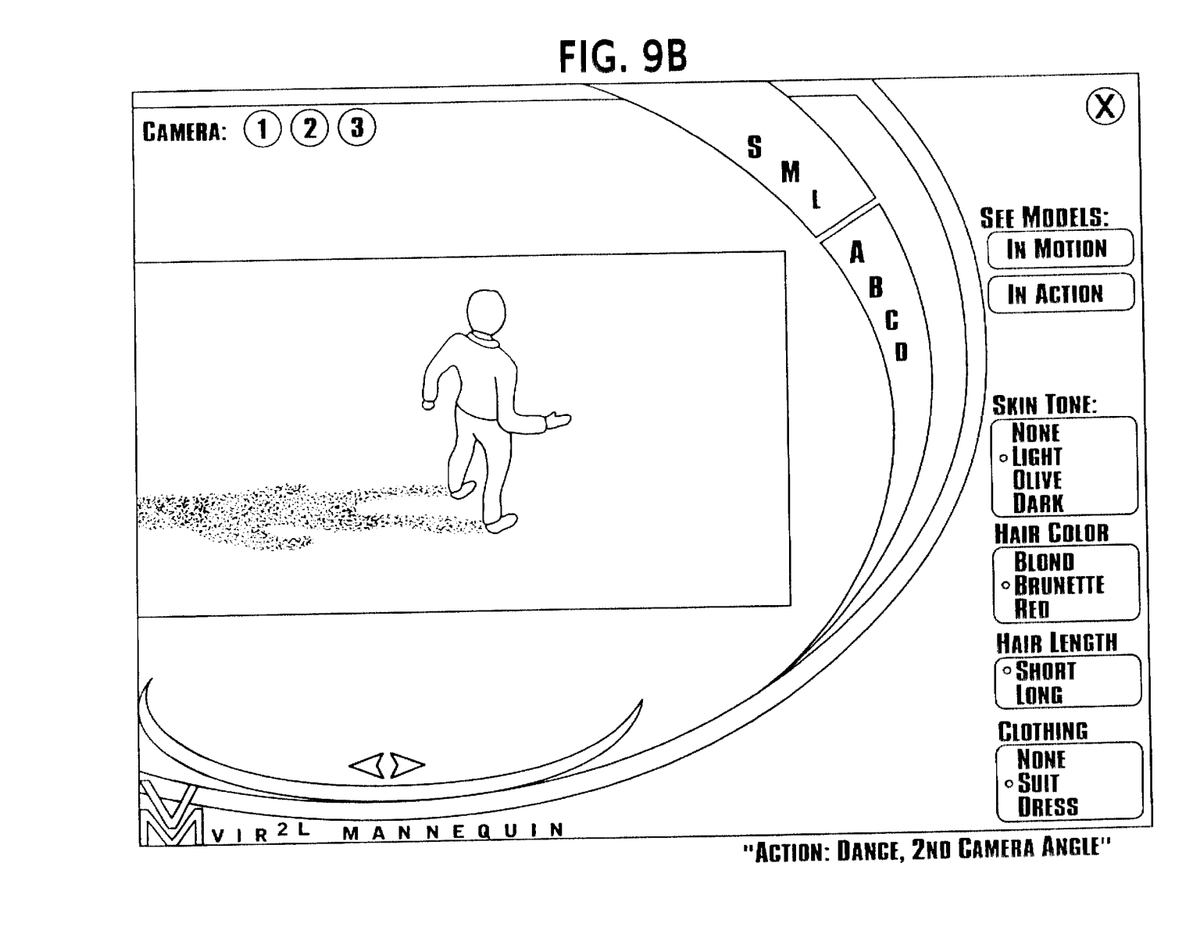

FIGS. 9A–B are an illustration of the personalized computer-rendered model of a person in a specified action/environment, with varying camera angles. Here, the model 1 is illustrated in a discotheque. The first camera angle as shown in FIG. 9A is a close up front view. The second camera angle as shown in FIG. 9B is a rear flyover camera angle. Other camera angles could be provided. The model 1 is clearly 3-dimensional.

Reference is made again to FIG. 1. The computer-rendered three-dimensional mannequin is utilized by a user as follows. Initially, the system displays a default model 1, and selection and feature controls 7, 9, 11, 13, 15, 17, 19 and 21. In the preferred embodiment, the default model 1 has intermediate size and proportions, with no motion, action or garment selected, as illustrated in FIG. 2. The default model alternatively could be set, for example, to any other combination of sizes, proportions, clothing, etc; or could be set using a cookie to a prior model utilized by the user.

Utilizing the selection and feature controls 7, 9, 11, 1, 15, 17,19 and 21, in no particular order, the user personalizes the model 1. The user selects one of several sizes using the size selection control 7; and selects one of several proportions using the proportion selection control 9. Although the illustrated embodiment provides proportion selection control only for cup size, alternative or additional proportions may be provided for, as discussed above. If desired, the user selects one of several features via the feature controls 15, 17, 19 for skin tone, hair color and hair length. Preferably, as each selection is made by the user, the model 1 is automatically modified to reflect the selection.

The user utilizes the clothing selection control 21 to select one of several garments that may be "worn" by the model 1. The clothing selection control 21 also provides for a garment selection of "none", in which the model 1 is unclothed. When utilized in connection with an online or interactive catalog, the clothing selection control 21 provides a selection of garments corresponding to those garments available from the catalog or manufacturer. Where there are numerous garments, a more detailed user interface should be provided to select an appropriate garment, garment color, etc. from the catalog.

The user rotates the model 1 utilizing the rotational selection control 5.

In order to observe the model 1 (and garment) in motion, the user selects the motion selection control 11. The model 1 is then displayed in motion on the computer screen, following a pre-set pattern of motion. In order to observe the model 1 (and garment if selected) in action and in an environment, the user selects the action control 13. There are provided several actions and environments. In the preferred embodiment, the action and environment corresponds to the garment selected by the user; thus, when the user selects the action selection control 13, the action is automatically selected to correspond to the garment selected by the user. While an environment/action is selected, the user may select one of several camera angles for observing the model in action.

The user may change the garment on the model by selecting the garment selection control 21. Similarly, the user may adjust the size, proportions or feature selections by selecting one of the controls 7, 9, 15, 17, 19.

Although the model as illustrated and discussed is a female model, it will be appreciated that the principles herein readily could be applied to a male model or a child model.

The system could be provided to a local user, on a central system. Alternatively, the garment data and/or model data could be stored on a disk, and provided to a user on a periodic basis (for example as a catalogue)l; with the controlling software provided on a central system accessible to the user via communications. Alternatively, the system could be made available via a multiple-user communications system, such as the internet.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A system for displaying garments on a computer-rendered three-dimensional model, comprising:
   (A) a computer-rendered model, the model being three-dimensional and capable of being rotated;
   (B) a size selection control, for selecting one of a plurality of sizes, a selected one of the sizes to be applied to the model;
   (C) a proportion selection control for selecting one of a plurality of proportions, a selected one of the proportions to be applied to the model; and
   (D) a garment selection control for selecting one of a plurality of garments stored in three-dimensional form, a selected one of the garments to be displayed on the model; wherein each of the plurality of garments includes garment qualities, the garment qualities including at least one selected from a group consisting of fabric drape, fabric flow, fabric deformation, fabric transparency, and fabric reflectivity.

2. The system of claim 1, further comprising a motion selection control for selecting a motion to be applied to the model.

3. The system of claim 1, further comprising an action selection control to apply an action to the model.

4. The system of claim 1, further comprising an appearance feature selection control for selecting one of a plurality of appearance features, a selected one of the appearance features to be applied to the model.

5. The system of claim 4, the appearance feature selection control corresponding to hair length.

6. The system of claim 4, the appearance feature selection control corresponding to hair color.

7. The system of claim 4, the appearance feature selection control corresponding to skin tone.

8. The system of claim 3, wherein the action selection control automatically selects the action corresponding to the selected garment from a plurality of actions, each of the actions corresponding to ones of the garments.

9. The system of claim 1, further comprising a rotation selection control for rotating the model.

10. The system of claim 1, further comprising stored data corresponding to each of a plurality of models.

11. The system of claim 1, further comprising stored data corresponding to the plurality of proportions.

12. The system of claim 1, further comprising stored data corresponding to the plurality of garments.

13. The system of claim 12, wherein the stored data corresponding to the plurality of garments is stored on a magnetic storage media.

14. The system of claim 1, further comprising a centralized computer on which the model is rendered, and a remote computer on which the model is displayed.

15. A method for displaying garments comprising the steps of:
storing a computer-rendered three-dimensional model;
storing a plurality of computer-rendered three-dimensional garments, wherein each of the plurality of garments includes garment qualities, the garment qualities including at least one selected from a group consisting of fabric drape, fabric flow, fabric deformation, fabric transparency, and fabric reflectivity;
accepting a selection of a three-dimensional garment from the stored three-dimensional garments from the user;
accepting a selection of one of a plurality of sizes from the user;
accepting a selection of one of a plurality of proportions from the user;
applying a size selected by the user to the model;
applying a proportion selected by the user to the model; and
displaying the selected three-dimensional garment on the model.

16. The method of claim 15, further comprising the steps of:
accepting a selection of a motion to be applied to the model; and
displaying the model in the selected motion.

17. The method of claim 15, further comprising the steps of:
accepting a selection of an action to be applied to the model; and
displaying the model in the selected action.

18. The method of claim 15, further comprising the steps of:
accepting a selection of one of a plurality of appearance features; and
applying the selected appearance feature to the model.

19. The method of claim 18, wherein the appearance feature corresponds to hair length.

20. The method of claim 18, wherein the appearance feature corresponds to hair color.

21. The method of claim 18, wherein the appearance feature corresponds to skin tone.

22. The method of claim 15, further comprising the step of rotating the three-dimensional model about an axis upon a command by the user.

23. The method of claim 15, wherein the three-dimensional garments include at least one surface property selected from the group consisting of reflectivity, fabric drape, fabric flow, texture and color.

24. The method of claim 15, wherein the three-dimensional garments include reflectivity information.

25. The method of claim 15, wherein the three-dimensional garments include fabric drape information.

26. The method of claim 15, wherein the three-dimensional garments include fabric flow information.

27. The method of claim 15, wherein the three-dimensional garments include texture information.

28. The method of claim 15, wherein the three-dimensional garments include color information.

29. The method of claim 15, wherein the three-dimensional garments include reflectivity, fabric drape, fabric flow, texture and color information.

* * * * *